United States Patent [19]

Leech

[11] Patent Number: 5,468,798
[45] Date of Patent: Nov. 21, 1995

[54] BASECOAT FOR A COATING SYSTEM

[75] Inventor: Lawrence D. Leech, West Chester, Pa.

[73] Assignee: Whitford Corporation, West Chester, Pa.

[21] Appl. No.: 198,445

[22] Filed: Feb. 18, 1994

[51] Int. Cl.$^6$ .............................. C08K 3/08; C08L 79/08
[52] U.S. Cl. ................ 524/440; 524/439; 524/441; 524/538
[58] Field of Search ..................... 524/439, 440, 524/441, 494, 495, 496, 544, 538

[56] References Cited

U.S. PATENT DOCUMENTS

| | | | |
|---|---|---|---|
| 3,860,559 | 1/1975 | Minami et al. | 524/104 |
| 4,049,863 | 9/1977 | Vassiliou | 428/324 |
| 4,098,756 | 7/1978 | Miller | 260/42.27 |
| 4,353,950 | 10/1982 | Vassiliou | 428/195 |
| 4,377,652 | 3/1983 | Ohmura et al. | 524/440 |
| 5,049,295 | 9/1991 | Takemura | 252/62.54 |
| 5,049,437 | 9/1991 | Tannenbaum | 428/215 |
| 5,071,695 | 12/1991 | Tannebaum | 428/216 |
| 5,079,073 | 1/1992 | Tannebaum | 428/216 |
| 5,106,682 | 4/1992 | Matsushita | 428/324 |
| 5,250,356 | 10/1993 | Batzar | 428/421 |
| 5,296,183 | 3/1994 | Carbone | 264/131 |

FOREIGN PATENT DOCUMENTS

| | | | |
|---|---|---|---|
| 58-053966 | 3/1983 | Japan | C09D 5/25 |
| 0004569 | 1/1985 | Japan | 524/440 |
| WO92/10549 | 6/1992 | WIPO . | |

OTHER PUBLICATIONS

Chemical Abstracts, Oct. 29, 1979, vol. 91, No. 18, p. 72, abstract No. 142223.

*Primary Examiner*—Peter A. Szekely
*Attorney, Agent, or Firm*—Baker & Daniels

[57] ABSTRACT

A basecoat for a nonstick coating system wherein the basecoat comprises a high temperature binder resin, preferably polyamideimide resin, and a filamentary powder, preferably a nickel powder, which is combined with the high temperature binder to yield a spongelike coating which with appropriate application has a rough surface and an internal structure containing interlocking channels. These channels may be impregnated by subsequently applied coatings, especially nonstick fluoropolymer coatings.

17 Claims, 2 Drawing Sheets

BASECOAT FOR A COATING SYSTEM

BACKGROUND OF THE INVENTION

The present invention relates generally to adhesive compositions for securing a coating, such as a nonstick coating, to a substrate and, more particularly, to an adhesive composition or basecoat that can be applied directly onto either a treated or untreated substrate to secure one or more coatings to the substrate.

Fluoropolymer resins such as polytetrafluoroethylene resins (PTFE), fluorinated ethylene propylene resins (FEP), perfluoroalkoxy resins (PFA), or combinations thereof are known to have superior nonstick properties. Therefore, such resins are used in a variety of industries, including the cookware industry to minimize the sticking of food particles to the cookware. Due to the nonstick nature of fluoropolymer resins, there have been difficulties in making the coatings adhere well to the substrate.

Conventionally, adhesive resins or basecoats have been used in order to better adhere the fluoropolymer topcoat to the substrate. In general, such basecoats are a combination of a high temperature binder resin such as polyamideimide resins (PAI), polyethersulfone resins (PES) or polyphenylene sulfide resins (PPS) with a fluoropolymer resin. The performance of these basecoats depends upon a stratification of the applied coating. This stratification has resulted in a coating rich in high temperature binder on the bottom and rich in fluoropolymer at the top. The binder-rich bottom provides adhesion to the substrate while the fluoropolymer-rich top provides a layer to which subsequent fluoropolymer topcoats could be fused by sintering at high temperature.

The performance of such systems is at best a compromise. The bottom layer of these basecoats is not a purely binder resin. Therefore, roughening of substrates by mechanical (e.g. gritblasting) or chemical (e.g. etching) means is required to assist the basecoat in holding the topcoat onto the substrate. Also, considerable levels of fluoropolymer resins are required in the basecoat in order to provide a top layer sufficiently rich in fluoropolymer resin for good bonding of subsequent fluoropolymer topcoats. These fluoropolymer resins in the basecoat are disadvantageous because they detract from the adhesion of the basecoat to the substrate, and they produce soft and damage-prone basecoats due to the thermoplasticity of the fluoropolymer resin.

Efforts to overcome these deficiencies have included the addition of mica particles, ceramic fillers or metal flakes to the basecoat in order to increase the hardness of these basecoats. However, such additives do not improve adhesion of the topcoat to the substrate.

It has also been attempted to apply nonstick coating systems to untreated smooth substrates. In each of U.S. Pat. Nos. 5,049,437, 5,071,695, and 5,079,073, there is disclosed a coating composition comprising an undercoat applied to the substrate, a primer containing a perfluorocarbon resin applied to the undercoat, and a topcoat applied to the primer and comprising a perfluorocarbon resin. According to these patents, the adhesion of high melt viscosity fluoropolymer coatings to substrates is achieved through chemically induced stratification or formation of a concentration gradient in the primer. Nevertheless, the coating compositions disclosed in these patents exhibit the same problems as described above.

It is desired to provide a basecoat for nonstick coating systems in which the nonstick coating is firmly anchored in the basecoat, and the basecoat firmly adheres to a smooth or roughened substrate.

SUMMARY OF THE INVENTION

The present invention provides a coating system for a substrate, comprising a high temperature polymer resin having a filamentary powder dispersed throughout the resin, wherein the powder is of such morphology that it imparts an absorbing spongelike structure to the basecoat which is capable of being impregnated with a coating material.

Generally, the invention provides a substrate having a top coating, such as a nonstick coating, applied and secured thereto by a basecoat. The nonstick coating may be one of a variety of fluoropolymer resins, such as PTFE, FEP, PFA, or combinations thereof. The nonstick coating is secured to the substrate by a basecoat or primer material. The basecoat contains a high temperature binder material. The preferred binder should have high strength and toughness, stiffness and abrasion resistance, and superior high temperature properties. The binder may be a thermosetting resin such as a silicone polymer, especially silicone resins. The binder may also be a high temperature thermoplastic polymer such as PAI, PES and PPS or blends thereof. Although the binder may include a certain amount of fluoropolymer therein, this is not necessary. The basecoat further includes a powder homogeneously dispersed throughout the binder. The powder may be of any particular material that causes the basecoat to become spongelike in nature, sufficient to anchor a topcoat therein. It has been found that substantially pure filamentary nickel powder is one of the preferred powders.

An advantage of the basecoat of the present invention is that it has extremely good adhesion to metal, glass or ceramic substrates with or without the conventional roughening pretreatment of such substrates.

Another advantage of the basecoat of the present invention is that a fluoropolymer coating can be firmly anchored in the basecoat with little or no fluoropolymer in the basecoat.

Another advantage of the basecoat of the present invention is that it has very high wear resistance and scratch resistance which is desirable in nonstick coatings.

The present invention provides in one form thereof, a basecoat for application of a fluoropolymer coating to a metal or ceramic substrate. The basecoat comprises a homogeneous mixture of a PAI resin and a filamentary powder of substantially pure nickel. Addition of the nickel powder to the PAI resin yields a spongelike mixture having a rough surface and an internal structure containing interlocking channels. Upon application of a fluoropolymer coating to the basecoat, the basecoat absorbs the resin and firmly anchors the resin therein. The nickel filaments at the top surface of the basecoat project upwardly to anchor in and firmly adhere to the fluoropolymer coating. Thus, the present invention minimizes or eliminates the need for a separate fluoropolymer layer in the basecoat. Instead, good intercoat adhesion is achieved by a mechanical anchoring of the fluoropolymer coating in the rough surface and interlocking channels of the basecoat.

The present invention, in another form thereof, comprises a method of preparing a basecoat to enable a fluoropolymer coating to be applied to a substrate. The method includes the step of dissolving a high temperature binder resin, preferably a PAI resin, in N-methyl pyrrolidone (NMP) to form a solution. A surfactant, preferably ethoxylated tetramethyldecynediol, and water are added to the solution, resulting in a dispersion containing small curds of the PAI resin suspended in the water/NMP mixture. Filamentary nickel powder is slowly added to this mixture and mixed until a homogeneous mixture is achieved and a desired viscosity is obtained. The mixture is then applied to a substrate and dried resulting in a basecoat having an internal spongelike structure and a rough top surface including a plurality of filaments projecting up from the PAI resin and capable of anchoring at least one finish coat to the basecoat. Subsequently, a fluoropolymer coating is applied to the basecoat.

DESCRIPTION OF THE PREFERRED EMBODIMENT

Figure 1:
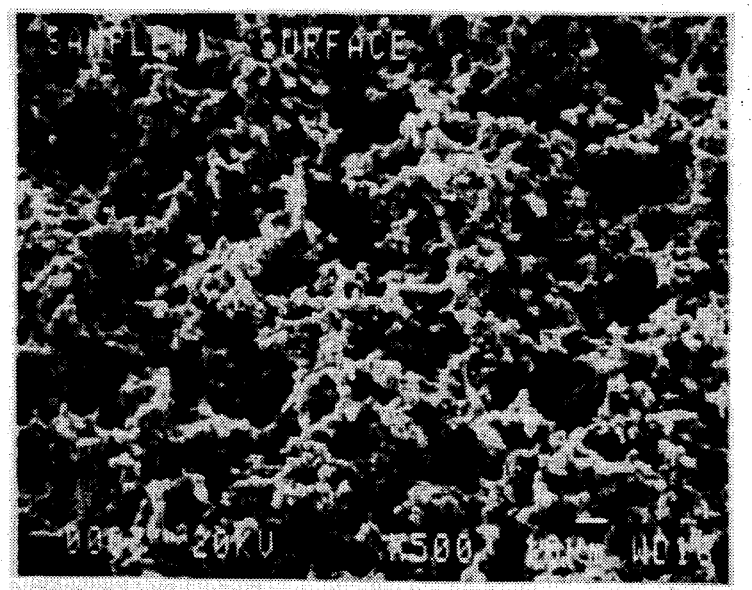
FIG. 1 is a scanning electron micrograph showing the surface of an aluminum substrate coated with a basecoat prepared in accordance with principles of the present invention.

In accordance with the present invention, a nonstick coating system is provided that is especially suitable for use in the food industry on cookware and electrical appliances used in the preparation of food. However, the present invention is also applicable to industrial use, particularly in electrical/electronic, automotive, office copy machine, and aerospace industries.

In an exemplary embodiment of the present invention, a polyamideimide (PAI) resin is mixed with a filamentary metal powder to yield a spongelike basecoat that has a rough surface and an internal structure containing interlocking channels. The channels are subsequently impregnated by a nonstick fluoropolymer coating. A preferred filamentary powder is a filamentary nickel powder such as those commercially available from Novamet Corp., a division of INCO Company. A typical chemical analysis of a preferred filamentary nickel powder is as follows:

| carbon | 0.25 max (weight percent) |
|---|---|
| oxygen | 0.15 max |
| sulphur | 0.001 max |
| iron | 0.01 max |
| other elements | trace |
| nickel | balance |

The physical characteristics of the nickel filamentary powder include an average particle size ranging from 2.2 to 3.3 microns, and preferably 2.3 to 2.8 microns. These sizes are determined by a Fisher sub-sieve sizer. The apparent density of the powders ranges from 0.5 to 1.0 g/cc, and preferably 0.5 to 0.65 g/cc. Finally, the specific surface area ranges from 0.58 to 0.68 $M^2/g$. The preferred nickel powders are produced by the thermal decomposition of nickel carbonyl and are virtually free of other metallic impurities, as indicated above.

In the preparation of the basecoat, a PAI dispersion is prepared. The dispersion is prepared by dissolving a PAI resin in N-methyl pyrrolidone (NMP) with vigorous stirring to form a 35:65 PAI:NMP (weight percent) solution, which is then slowly added to a mixture of deionized water and a surfactant such as polyethoxylated acetylenic diol, commercially available as Surfynol 440 from Air Products and Chemicals Inc., with vigorous mixing. This causes the PAI resin to precipitate in the form of small curds. These curds are further reduced in size by grinding, preferably in a pebble mill for 14–16 hours. Carbon black may be added to this dispersion for color. The dispersion is discharged from the pebble mill, and the mill is rinsed with additional deionized water. The final dispersion is a fluid, stable dispersion of PAI resin particles in a water/NMP mixture.

A preferred composition of ingredients of the PAI dispersion is as follows:

| Deionized water | 47.2 (weight percent) |
|---|---|
| PAI resin solution | 47.8 |
| Surfynol 440 wetting agent | 1.0 |
| Channel process carbon black | 4.0 |

The nickel powder is added slowly to the PAI dispersion with moderate stirring. After the addition is complete, stirring is continued until the mixture is homogenous. Deionized water is then added until a desired viscosity is obtained. A preferred composition of the final basecoat is as follows:

| Dispersion of PAI resin | 65.3 (weight percent) |
|---|---|
| Filamentary nickel | 22.4 |
| Deionized water | 12.3 |

The basecoat may be applied to metal or ceramic substrates using an air atomizing spray gun. Adhesion to these substrates is very good without additional roughening traditionally employed to enhance the adhesion of nonstick coatings to the substrates. However, roughening by gritblasting or chemical etching can be employed in conjunction with the present invention to improve the adhesion of the basecoat to the substrate.

The basecoat may be applied to the substrate as is or may be reduced with water. An amount of basecoat is applied sufficiently to achieve a dry film thickness of 0.5 to 2.0 mils (12.5 to 50 microns), and preferably 0.9 to 1.2 mils (22.5 to 30 microns) as measured by an electronic film thickness gauge. The basecoat is dried at a temperature of about 200° F. (93° C.) for approximately two minutes.

Figure 2:
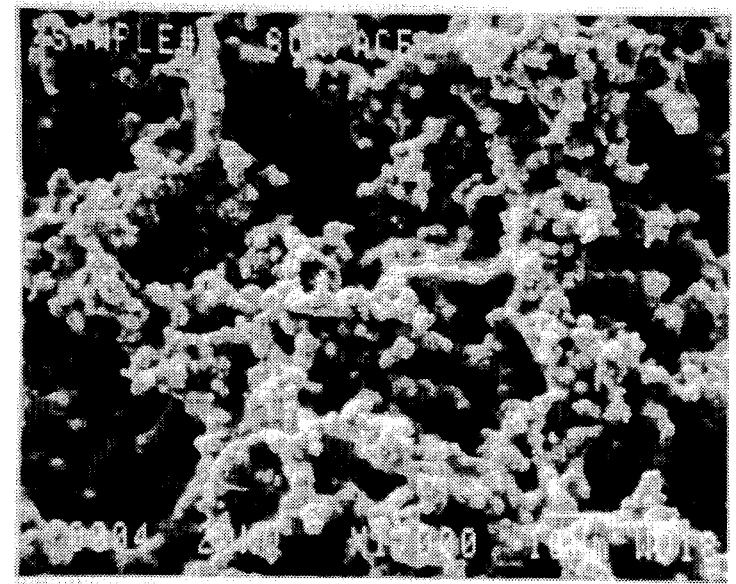
FIG. 2 is an enlarged view of a portion of FIG. 1.
Figure 3:
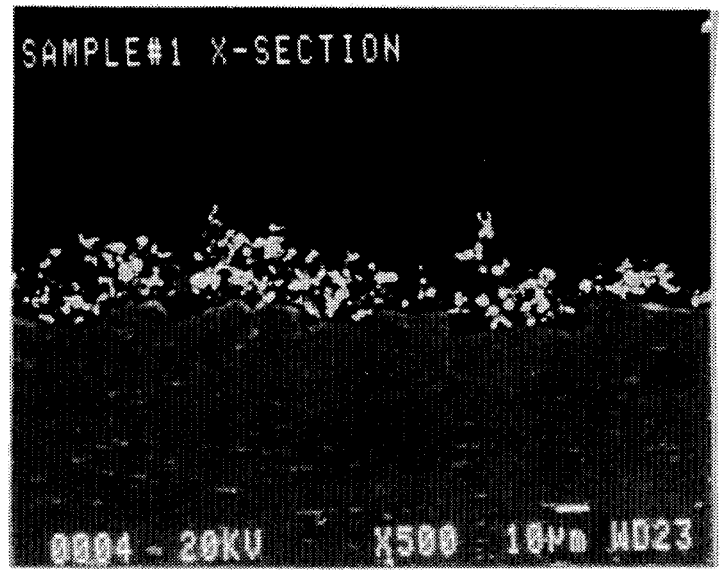
FIG. 3 is a scanning electron micrograph, particularly showing the basecoat of FIG. 1 in section.
Figure 4:
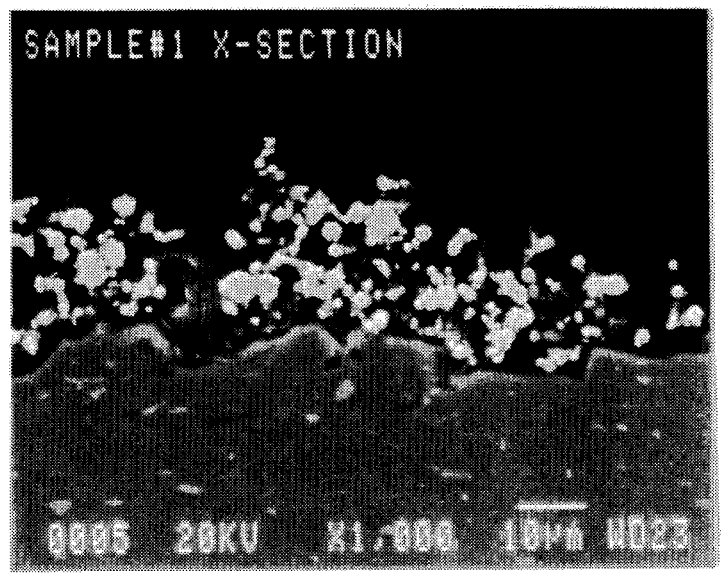
FIG. 4 is an enlarged view of a portion of FIG. 3.

The resulting dried basecoat is rough, spongelike and matte in appearance. Referring to FIGS. 1 and 2, scanning electron micrographs of the coating as it is applied to an aluminum substrate illustrate that the surface of the coating is uniformly rough and spongelike. Referring to FIGS. 3 and 4, similar micrographs of cross sections through the coating show that the metal filaments project upwardly to anchor and support the subsequent fluoropolymer finish coat. Measurements of the surface roughness of the basecoat using a stylus type profilometer give a range of 150–190 microinches AA over a smooth substrate.

The internal spongelike nature of the basecoat greatly affects the film thickness as measured by an electronic gauge. When the actual applied weight per unit area of the dried basecoat is measured, the amount found is comparable to the weight per unit area that would be expected for a solid coating thickness only one third of that actually measured by the electronic gauge. This finding substantiates the spongelike quality of the coating.

The development of the internal channel structure of the basecoat as well as proper surface roughness is important for subsequent adhesion of the nonstick fluoropolymer finish coats to the basecoat.

After drying the basecoat, one or two nonstick fluoropolymer finish coats may be applied to the basecoat. Such finish coats are composed mainly, but not exclusively of aqueous dispersions of polytetrafluoroethylene (PTFE), many of which are commercially available at 50–60% solids by weight concentration. Other ingredients include metallic mica pigments, wetting agents, defoamers and thickeners, and emulsions or dispersions of other film-forming resins such as acrylic or silicone resins, among others. Typically, a midcoat and topcoat are applied at a dry film thickness of 0.4 mil (10 microns) each. After a brief drying step, the entire coating system is cured at a temperature between 750°–820° F. (400°–438° C.) for approximately five minutes.

The resulting coating system is especially suitable for use on cookware and electric appliances used in the preparation of food. Cut-through resistance and abrasion resistance tests show at least a doubling of performance for the described system in comparison to conventional fluoropolymer coating systems. For example, a #7447 SCOTCHBRITE™ pad was used to abrade the surface of a described coating and a conventional coating. The abrasion was accomplished by means of a drill press which held the pad against the coated surfaces at a fixed pressure and rotated the pad at 460 rpm. The time to wear through the coating was recorded, and the coating described herein resisted wear through to the substrate for more than twice as long as conventional coating materials. Other non-quantitative tests, such as in-home testing, accelerated cooking tests and knife or fingernail scratch tests show a similar superiority of the described coating versus a conventional nonstick coating.

Although the above embodiment identifies a preferred composition of the basecoat, other compositions are possible. Particularly, it has been found that blends of filamentary nickel powders with PAI resins in a ratio of approximately 15%–40% nickel to 85%–60% PAI resin, on a percent volume of the dry film, yield the required characteristics for the basecoat. It is further noted that the dispersion technique and the degree of the final dispersion of the filamentary nickel powder in the binder mixture are very important in obtaining the proper internal channel structure and desired surface roughness of the basecoat. The amount of the dispersion depends upon the design of the mixer and the batch size and must be determined empirically for each set of conditions.

Although the above description pertains specifically to a PAI binder and a nickel filamentary powder, it will be appreciated that other binders and powders fall within the spirit and scope of the present invention. For example other thermoplastic and thermosetting polymers may be employed if they are sufficient to firmly adhere to a substrate. Likewise other metallic and nonmetallic powders may be used if they form a spongelike material and a rough surface that enables a topcoat to become anchored therein.

The present invention is also applicable to the application of nonfluoropolymer coatings onto a substrate. For example, the present invention is applicable to various types of coatings used in the highly abrasive environments of paper handling equipment such as office copy machines and paper making machinery.

It will be appreciated that the foregoing is presented by way of illustration only, and not by way of any limitation, and that various alternatives and modifications may be made to the illustrated embodiment without departing from the spirit and scope of the invention.

What is claimed is:

1. A basecoat for a coating system, comprising:
    a high temperature polymer resin of sufficient binding capacity to adhere to a substrate; and
    a filamentary powder dispersed throughout said polymer resin to form an adhesive mixture which with appropriate application to a suitable substrate results in the basecoat having an internal spongelike structure and a rough top surface including a plurality of filaments projecting up from said polymer resin and capable of anchoring at least one finish coat to the basecoat.

2. The basecoat of claim 1, wherein said high temperature polymer resin is a polyamideimide resin.

3. The basecoat of claim 1, wherein said filamentary powder is a nonferrous metal.

4. The basecoat of claim 3, wherein said filamentary powder is a filamentary nickel powder.

5. The basecoat of claim 2, wherein said filamentary powder is a filamentary nickel powder.

6. The basecoat of claim 5, wherein said nickel powder is present in said mixture from 15% to 40% of the total dry volume of said mixture.

7. The basecoat of claim 5, wherein said nickel powder constitutes about 22.4 weight percent of said mixture.

8. A basecoat for a nonstick coating composition, comprising:
    a high temperature polymer resin of sufficient binding capacity to adhere to a substrate; and
    a filamentary powder dispersed throughout said polymer resin to form an adhesive mixture which with appropriate application to a suitable substrate results in the basecoat having an internal spongelike structure and a rough top surface including a plurality of filaments projecting up from said polymer resin and capable of anchoring at least one fluoropolymer coating to the basecoat.

9. The basecoat of claim 8, wherein said high temperature polymer resin is a polyamideimide resin.

10. The basecoat of claim 8, wherein said filamentary powder is a nonferrous metal.

11. The basecoat of claim 10, wherein said filamentary powder is a filamentary nickel powder.

12. The basecoat of claim 9, wherein said filamentary powder is a filamentary nickel powder.

13. The basecoat of claim 12, wherein said nickel powder is present in said mixture from 15% to 40% of the total dry volume of said mixture.

14. The basecoat of claim 12, wherein said nickel powder constitutes about 22.4 weight percent of said mixture.

15. A method of forming a basecoat for securing a nonstick coating to a substrate, the method comprising the steps of:
    dissolving a polyamideimide (PAI) resin in N-methyl pyrrolidone (NMP) to form a solution;
    adding a surfactant and water to the solution and agitating to form a dispersion in which the PAI resin is precipitated into small curds; and
    adding a filamentary metal powder to the dispersion and agitating until a homogeneous mixture is achieved.

16. The method of claim 15, including the step of grinding the small curds to further reduce the size of the curds before the step of adding the filamentary powder.

17. The method of claim 15, including the step of adding carbon black to the dispersion.

* * * * *